J. M. Dashiell,
Meal Bin.
No. 101,438. Patented Apr. 5, 1870.
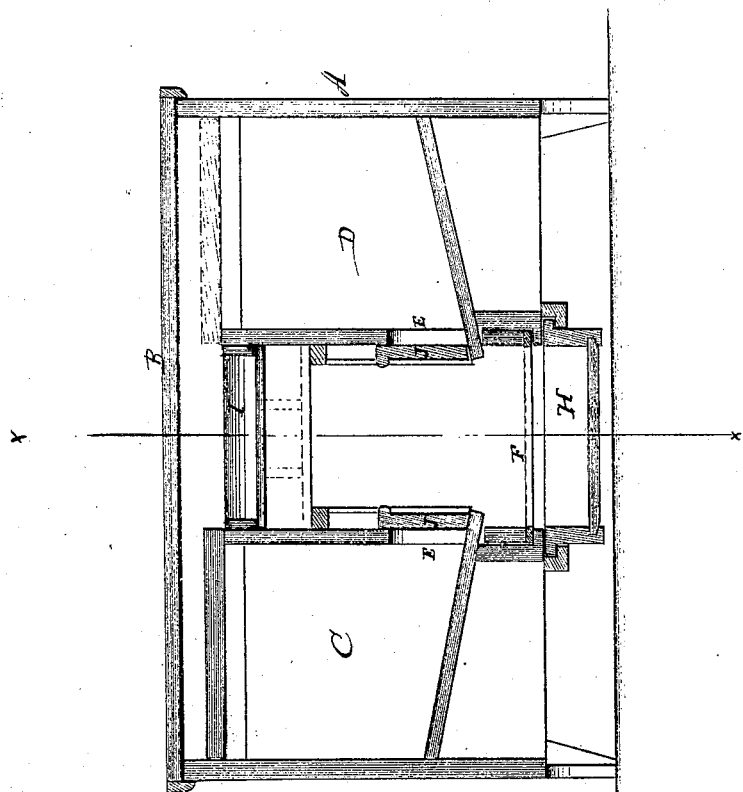
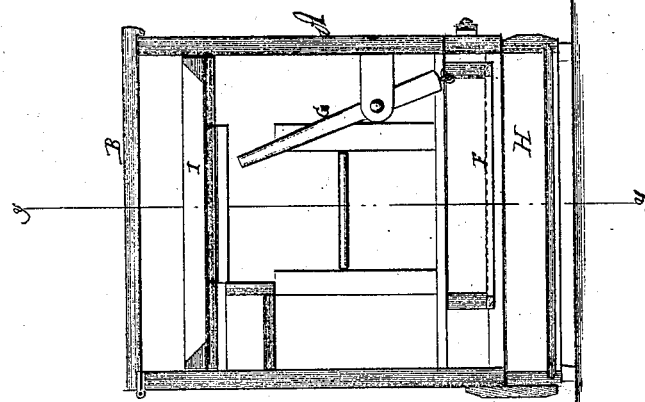

United States Patent Office.

JOHN M. DASHIELL, OF DECATUR, ILLINOIS.

Letters Patent No. 101,438, dated April 5, 1870.

IMPROVED FLOUR AND MEAL-CHEST.

The Schedule referred to in these Letters Patent and making part of the same

*To all whom it may concern:*

Be it known that I, JOHN M. DASHIELL, of Decatur, in the county of Macon and State of Illinois, have invented a new and useful Improvement in Flour and Meal-Chest; and I do hereby declare that the following is a full, clear, and exact description thereof, which will enable others skilled in the art to make and use the same, reference being had to the accompanying drawings formings part of this specification.

The object of this invention is to provide a convenient receptacle for meal, flour, and other articles for domestic use, with facilities for sifting and preparing the flour and meal for use; and It consists in a chest partitioned off into compartments provided with a sieve and a receiving-drawer, as will be hereinafter more fully described.

In the accompanying drawing—

Figure 1 is a vertical cross-section on the line $x\,x$ of fig. 2.

Figure 2 is a vertical longitudinal section of fig. 1 on the line $y\,y$.

Similar letters of reference indicate corresponding parts.

A is the chest, which is of rectangular form, elevated on legs or otherwise, and provided with a hinged cover or lid, B.

C is a compartment for flour; and

D is a compartment for meal, both with inclined bottoms so that their contents may be readily discharged through the apertures E onto the sieve F.

This sieve rests on cleats or ways and is operated or vibrated back and forth horizontally by means of the lever G, as seen in fig. 1.

H is a drawer directly beneath the sieve for receiving the flour or meal.

I is a bread-tray directly beneath the cover.

The apertures E E are closed by the slides J J.

Below the bread-tray I are three (more or less) small compartments, (seen in dotted lines in fig. 2,) for holding spices and other similar articles.

To work the sieve, the cover B is raised and the bread-tray I is taken out. This gives access to and allows room to work the lever.

This chest is a most convenient article for the household, and its many advantages will be readily understood and appreciated by all.

Having thus described my invention,

I claim as new and desire to secure by Letters Patent—

The compartments C and D, (with their discharge-apertures E E,) bread-tray I, sieve F, and drawer H, when the same are combined and arranged in the chest A, substantially as and for the purposes herein shown and described.

JOHN M. DASHIELL.

Witnesses:
 FRANCIS H. DASHIELL,
 HENRY C. REDMON.